March 16, 1954     R. H. FLUES     2,671,935
WEATHER WELT
Filed Feb. 7, 1949     3 Sheets-Sheet 1
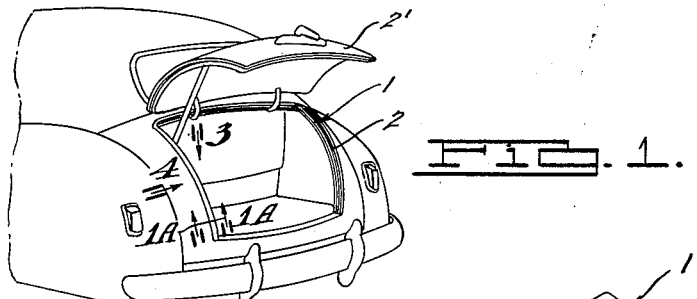
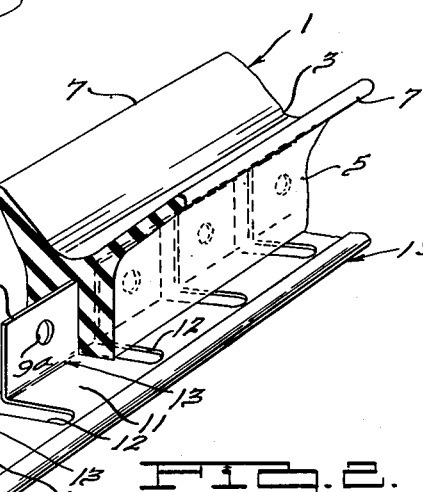
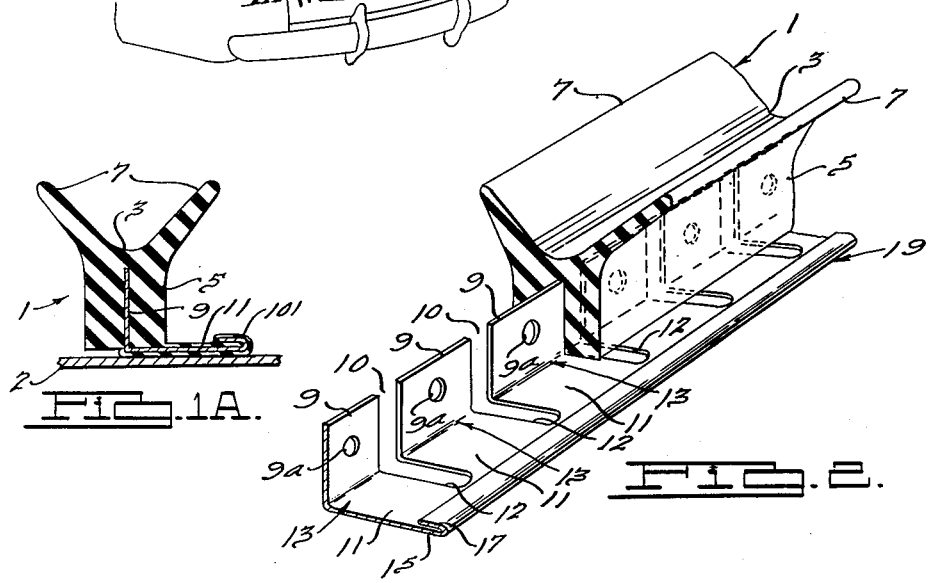
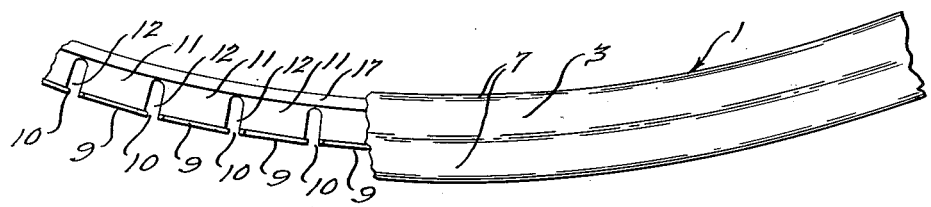
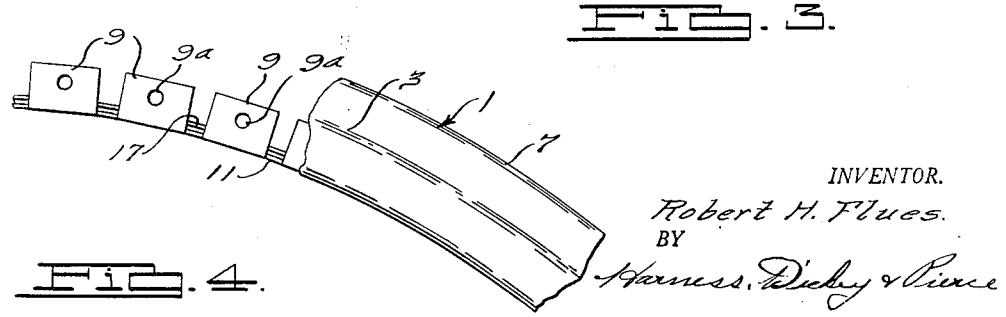
INVENTOR.
Robert H. Flues.
BY
Harness, Dickey & Pierce
ATTORNEYS.

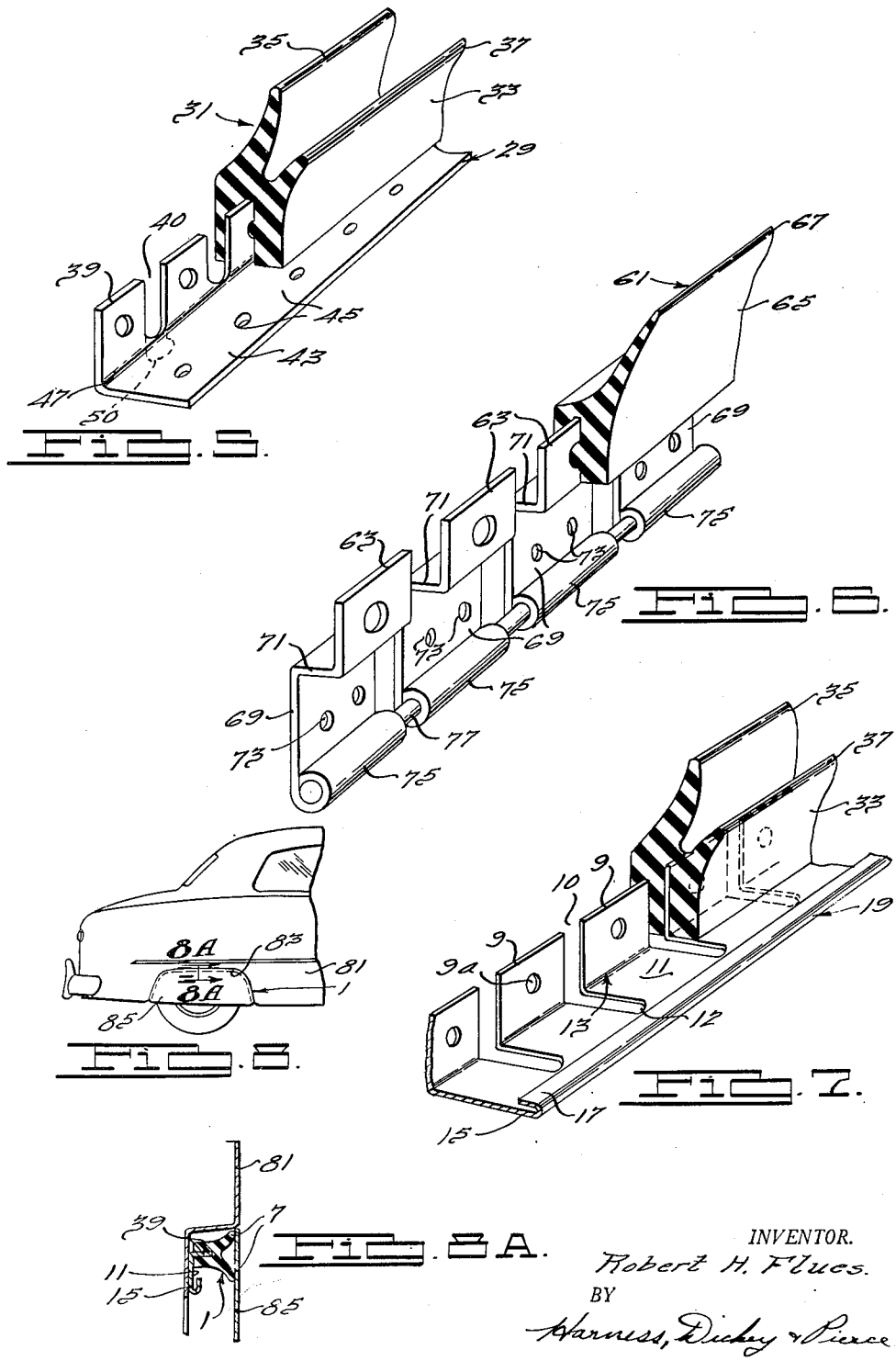

March 16, 1954 R. H. FLUES 2,671,935
WEATHER WELT
Filed Feb. 7, 1949 3 Sheets-Sheet 3
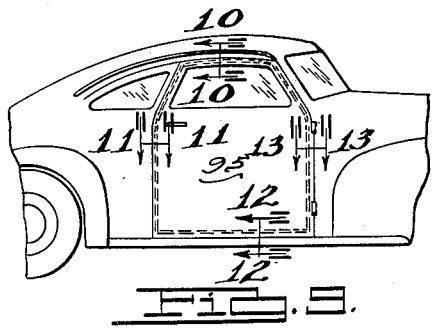
FIG. 9.
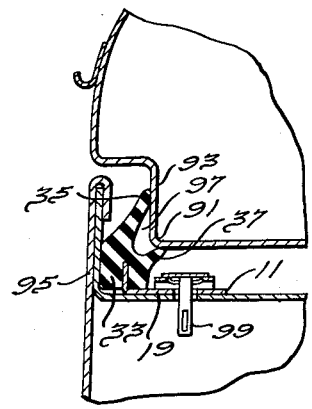
FIG. 10.
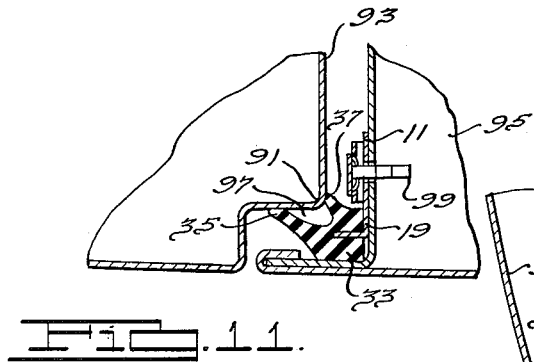
FIG. 11.
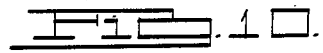
FIG. 12.
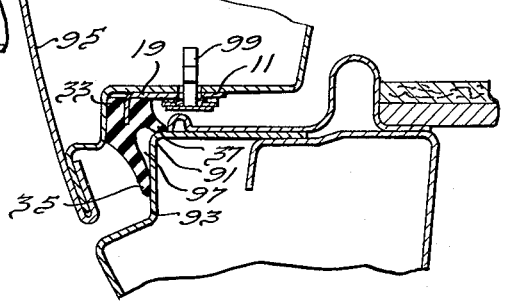
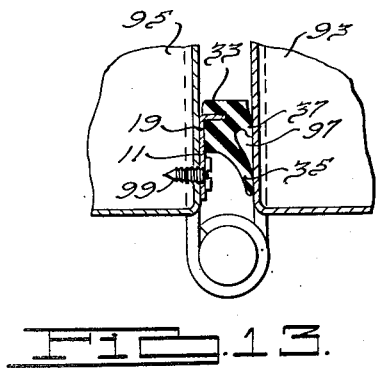
FIG. 13.
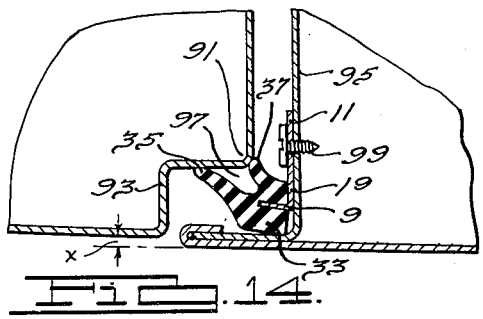
FIG. 14.
INVENTOR.
Robert H. Flues.
BY
Harness, Dickey & Pierce
ATTORNEYS.

Patented Mar. 16, 1954

2,671,935

UNITED STATES PATENT OFFICE 2,671,935

WEATHER WELT

Robert H. Flues, Detroit, Mich., assignor to Weld-O-Welt Corporation, Detroit, Mich., a corporation of Michigan Application February 7, 1949, Serial No. 74,876

8 Claims. (Cl. 20—69)

This invention relates generally to weather welts and sealing strips that have a yieldable portion for sealing engagement with a surface of a cooperating part and are used to seal the closed joint formed between two members such as automotive, refrigerator or other doors and door jambs, automobile hoods and cowls, fenders and wheel shields, vehicle luggage compartments and their covers, and in many similar applications.

As heretofore known, weather welts for this purpose comprise basically, elongated members of rubber-like material of various cross-sectional shapes which may or may not be reinforced by embedded metal strips. Though not so limited, the present invention is in particular concerned with welts that have yieldable portions which, except for the improvements of the present invention, are subject to buckling or collapse. In order to illustrate the principles of the invention, the description herein concerns largely its beneficial effects when used with a particular type of yieldable portion, viz., that illustrated by one or more laterally projecting lip-like extensions. This application is a continuation-in-part of the inventor's application Serial No. 749,966, filed May 23, 1947, now abandoned, entitled Method and Means for Weather Sealing Automobile Doors and the Like.

Weather welts of this known type are endowed with certain desirable features by virtue of the lip-like extensions. For example, they simplify the fitting together of adjoined members by eliminating the necessity for close dimensional tolerances, a feature of especial value to industries which employ mass production methods. In application involving a movable closure, the lip drags across a surface of the joint to wipe away moisture films. This flexing enables the lip to break up ice layers which may develop in cold weather. Where hermetically sealed joints of particular efficacy are desired, welts having more than one lip may be used to produce a seal which is under a slight vacuum. Except for the buckling or collapsing tendencies, such welts can also be used around corners and on irregularly surfaced joints.

Accompanying all these and other advantages of the lip-type weather welt, there is, unfortunately, a serious shortcoming. Its capacity for bending is extremely limited. As a consequence, it has been considered necessary heretofore to preform the welts to the contour of the joint to be sealed. Thus, due to obvious difficulties in the manufacture and distribution of curved welts, applications of lip-type welts have been largely confined to rectilinear joints.

The inability of the lip-type welt to satisfactorily bend through less than the largest curvatures is manifested by collapse or buckling of the lip. Collapse of the lip is evidenced in some cases by ripples or ruffles therein, and in other cases the lip falls outwardly in the direction in which it projects. When either of these modes of collapse is present, the lip loses its lateral resilience and flexibility and is unable to provide an effective seal.

The present invention produces the rather remarkable result of increasing the stability of the lips of welts of this type so that they may be bent through relatively sharp angles without collapse. The invention produces this result by providing a novel reinforcing strip which is embedded in the welt. Preferably also, the strip may serve the additional function of providing means for attaching the welt to the surface being sealed.

The fact that weather welts embodying the present invention may be bent without harmful lip-collapse eliminates the necessity for preforming them to the curvature of the surface to be sealed. Instead, the welts may be manufactured in straight lengths, and then bent or deformed to conform to the curvature of the structures being sealed as an incident in the attachment of the welts to the surfaces of these structures. Thus, the invention greatly facilitates the manufacture and distribution of weather welts and at the same time provides a weather welt of increased effectiveness in the performance of its function of sealing. Welts embodying the present invention may be bent in one or more planes and may thus be used to seal surfaces having either simple or compound curvatures. They may, of course, be used on flat surfaces. It will be recognized, therefore, that its extreme adaptability makes it impossible to foresee all of the possible applications of the present weather welt constructions.

It will also be recognized that the yieldable sealing member itself may be of numerous different shapes and still benefit by the incorporation therein of the reinforcing strip of this invention and that the emphasis herein on the lip-type form is not intended to limit the type sealing member to which the invention may be applied but merely to illustrate a particular embodiment wherein the improved results have been very striking. The shape of the sealing member depends largely upon the application and single and multiple lip, lip-gutter formations, rounded lips, solid sealing members, expansible sealing members (such as shown in application Serial No. 18,397 of Robert H. Flues and Curt Saurer filed April 1, 1948), and other shapes as dictated by a wide variety of usages may all be used in weather welts constructed in accordance with the principles of the invention.

By way of illustration only, and not of limitation, the improved weather welt is shown in the accompanying drawings in which:

Figure 1 illustrates a typical application of weather welts of the type herein referred to and shows, in perspective, the trunk or storage compartment of an automobile having the improved seal located around the periphery thereof.

Fig. 1a is a cross section taken on line 1a—1a of Fig. 1 and also shows a reinforcement and attachment strip which is coated or covered;

Fig. 2 is a view in perspective of a weather welt, constructed in accordance with the principles of the invention showing, in particular, the welt used in the structure of Fig. 1;

Fig. 3 is a view taken from position A in Fig. 1, with parts removed, and showing curvature of the welt in one plane;

Fig. 4 is a view taken from position B of Fig. 1, with parts removed, and shows curvature of the welt in another plane;

Fig. 5 is a perspective view of a modified form of the invention;

Fig. 6 is a perspective view of another modification of the invention;

Fig. 7 is a perspective view of a modified form of the invention;

Fig. 8 illustrates the application of the weather welt to a fender shield of an automobile;

Fig. 8a is a section taken on the line 8a—8a of Fig. 8;

Fig. 9 illustrates the application of the welt of either Fig. 5 or Fig. 7 to an automobile door;

Figs. 10, 11, 12 and 13 are sections taken on lines 10—10, 11—11, 12—12 and 13—13 of Fig. 9;

Fig. 14 shows how the weather welt may be deformed to overcome misfits in the door construction.

In Fig. 1 an automobile trunk opening is shown which has a welt 1, best shown in Figs. 1a and 2, that is constructed in accordance with this invention secured to the body frame 2 around the opening to effect sealing engagement with the trunk door 2'.

The welt 1 comprises an elongated rectilinear member 3 of rubber or similar material which may be formed in any of a wide number of cross-sectional shapes depending upon the members to be sealed. The member 3 has a base portion 5 which is preferably rectangular in cross section. In the form shown in Figs. 1-4, the member 3 also has a pair of divergent lip-like portions 7 projecting upwardly from the base portion 3. The lips 7 are flexible and adapted to readily conform to and seal the surface of a member pressed thereagainst.

Heretofore when welts of the form typified by the member 3 were bent even a slight amount, the lips buckled or collapsed and thereby lost their ability to yieldably press against and seal a member in contact therewith. It has been discovered however, that by embedding a particular form of reinforcement means in the member, that collapse of the lips is inhibited without sacrifice in the deformability of the member or its capability to be fitted to sharply curved surfaces. Basically, this means comprises a longitudinal series of unconnected plates 9 which are embedded in the base portion and bonded or affixed thereto by curing, cementing, or other suitable means well known in the trade, this affixation being facilitated, if desired, by holes 9a in the plates into which the rubber flows. Preferably, the plates are longitudinally spaced to provide slots 10 therebetween.

In further accordance with the invention, the plates 9, being affixed to the member 3, provide a convenient means for attaching the member to the surface which is being sealed. Hence, in Fig. 2, a longitudinal series of flange elements 11 extending outside of the member 3 are securely joined to the plates 9. The elements 11 are adapted to lie upon and be suitably attached to the surface being sealed, as by means of screws through the longitudinally spaced slots 12 between them. In practice, an element 11 and a plate 9 may conveniently comprise an integral section 13, the flange elements merely being extensions of the plates. In the form of the invention shown in Fig. 2, the sections 13 are formed by laterally slotting an elongated blank so that the outer edges of each of the flange elements 11 are interconnected by a longitudinal strip 15 which may be re-bent upon itself, as shown at 17, to increase its strength. If desired, the reinforcement member 19, which consists of the plates, flange elements, and strip, may be bent so that the plates 9 and elements 11 make a suitable angle with each other, 90° being shown in Fig. 2 for the welt 1 which is used on the trunk of Fig. 1.

It will be recognized from Figs. 1, 3 and 4 that the welt 1 must be curved in both the plane of plates 9 and the plane of the flange elements 11 in order to seal the trunk opening. With heretofore known welts, either of these curvatures would cause the lips of a sealing member to collapse. The present welt 1, however, can be easily conformed to those surfaces without this occurring and, in fact, is sufficiently resistant to lip collapse to enable the entire periphery of the trunk opening to be satisfactorily sealed by the use of one piece thereof which is bent around the corners of the opening.

It will be recognized that welts of the type herein described are of extremely long length as compared with their width and/or thickness. It is well known in the field of structural mechanics that when these physical conditions exist in a member it is elastically stable only when the applied loads are less than certain critical values. When these loads are exceeded, the member becomes unstable and will buckle or deform in a lateral direction, i. e., outside the plane of the forces. Lateral deformation of this type can, of course, be overcome or reduced by an increase in the lateral dimension of the member. In the case of weather welts with flexible lips, however, which represent an extremely aggravated case of "long" beams, such increase in thickness would defeat the purpose of the lips by reducing their lateral flexibility. Likewise, a continuous reinforcement member embedded in the welt is not a suitable solution to the problem because it overcomes buckling or collapse only to the extent that it reduces bendability of the member and to this extent the value of the welt for curved surfaces is decreased. It raises the critical loads but when these are exceeded buckling still occurs.

The improved results obtained by the practice of the present invention are believed to be at least in part due to the effect of the unconnected plates 9 in converting the welt from a "long" beam to a series of short elastically interconnected beams. When the welt is bent, the plates impart a stiffness to the adjacent sections of the rubber members which tend to make them behave as a series of short beams with bending couples applied at their ends. Such beams are not subject to elastic instability to any great extent within the range of ordinary forces. With the local tendencies to buckling removed or reduced in this manner, the resistance of the welt as a whole, which is the summation of these quasi-individual effects, is correspondingly improved.

This is not believed to be the only beneficial effect of the plates 9. By virtue of the bonded connection between the rubber and the plates, bodies of rubber within the member 3 surrounding the plates are subjected to desirable influences in bending. It will be recognized from Fig. 4 that when bending of the welt 1 occurs in the plane of the plates 9, the plates have sufficient flexural rigidity to resist deformation so that most of the deformation occurs in the short beam members defined by the slots 10. Since there is no deformation of the plates, there can be no deformation of the rubber layers bonded thereto. This influence of the plates in preventing local deformation of the rubber extends outwardly for finite distances and decreases gradually as the distance increases. In many shapes this influence probably extends into the base of the lip end, therefore, acts as a support reinforcement to increase resistance to buckling. Viewed from a slightly different standpoint, the plates 9 destroy the neutral surface which the member 3 would ordinarily have in bending. In its place is probably a complex series of surfaces upon which there are no bending stresses.

It is known from structural mechanics that axial compression can by itself cause buckling of metal beams and columns and in combination with bending moments tends to promote buckling. Rubber, representing a transition stage between an incompressible fluid and a metal, is even more prone than metals to lateral flow and buckling as a result of axial compression. It is, therefore, to be expected that by placing a rubber beam such as the member 3 in a state of axial tension rather than compression that the tendency to buckling would to some measure be overcome.

This state of axial tension is accomplished in bending of the welt 1 by virtue of the bonded connection between the plates 9 and the member 3 acting in conjunction with the stress effects produced by the provision of slots 10 and 12. As shown in Fig. 3, when the welt 1 is bent in the plane of the flange elements 11, the solid strip 15 is preferably on the inside of the curve. The member 3 is therefore extended through an arc of more than its normal length. This is permitted by stretching of the rubber in the slots 10 and 12 between the sections 13 of the reinforcement member 19. Such stretching creates a state of tension in the member 3 which is believed to oppose the tendency of the lips to collapse. It will be recognized, however, that it is not essential to the successful practice of the invention that the strip 15 be placed on the inside of the curve. Very often when it is placed on the outside of the bend, so that the member 3 is under a certain amount of compression, buckling does not occur and this is believed to be due to the effects of the other lip-stabilizing factors.

In many applications it is not necessary to bend the welt in the plane of the flange elements i. e. simple rather than complex bending is required. In such cases the reinforcement member 29 of the welt 31 (Fig. 5) may be used. This welt has a rubber member 33 which is provided with a pair of lips 35 and 37, the lip 35 being somewhat longer in a lateral direction than the lip 37 but both extending in the same general direction so that they are peculiarly adapted to fit on the converging sides of an angled surface, such as the corner of a door frame. The member 29 has a series of plate sections 39, corresponding to plates 9, and these are likewise embedded in the rubber and bonded thereto, the holes 39a being provided to improve this connection. The plates 39 are separated by the slots 40, which correspond to the slots 10. In the member 29, however, there are no slots corresponding to the slots 12 so that the flange section 43 is solid and may be angularly inclined to the plates 39, as shown, and provided with holes 45 for attachment purposes. Preferably, there is a relatively narrow strip or section 47 of the member 29 in the plane of the plates 39 which is solid. One edge of this strip may be considered as defined by the bottoms of the slots 40 and the other may be regarded as the line of intersection of the flange 43 with the plane of the plates 39. It will be recognized that actually in the particular embodiment shown the strip 47 is an integral part of the member 29 and this distinction is made for the purpose of convenience in description just as in the case of the strip 15. The strip 47 serves as a member of fixed length and when it lies on the inside of a curve in the plane of the plates 39 through which the welt 31 is bent, the rubber in the slots 40 is stretched to put substantially the entire cross section of the member 33 in a state of tension in a manner similar to that already described for bending of the member 3 about the strip 15. Thus, it will be recognized that the reinforcement member 29 is also capable of providing the welt 31 with the lip-stabilizing features described above, viz., (1) conversion from a long beam to a series of short beams, (2) rearrangement of the neutral surfaces, and (3) provision of a state of axial tension in the member 33.

While the form of member 29 just described is preferred it will be evident that the slots 40 can be extended a short distance into the flange 43 as shown at 50 by the dotted lines, without any particularly harmful effects. This would in effect eliminate strip 47 and provide a slot similar to slot 12 but of such short length that no appreciable longitudinal movement of the bottoms of the plates 39 could occur. The plane of the flange would therefore constitute a fixed length surface containing the axes about which the plates 39 would tend to rotate during bending, thus preserving the state of tension described above.

As suggested hereinbefore, the invention can, in its broader aspects, be successfully practiced by the use of separate plates which are not part of a common member such as the members 19 and 29. When this is done, it is still desirable to use the plates as a means for affixing the welt to the surface which is to be sealed and this, of course, is accomplished by extending the plates outside of the rubber member to provide attachment flanges. The plates are usually formed of metal, and it will be readily appreciated that when the projecting flange ends are not interconnected they constitute a definite hazard to safe handling of the welt. The lateral projecting edges provided in ordinary manufacture are as dangerous as knife blades and the resiliency of the rubber member is responsible for a relative motion thereof which is likely to result in slashed hands or materials. This problem is not present in welts 1 and 31 because the plates are joined to a solid outer edge, as the edge 15 and 17 of member 19.

The welt 61 (Fig. 6) shows a means of providing individually formed and embedded plates 63 with a safe outer edge. These plates are embedded as before in a rubber member 65 which, to illustrate another form of seal, has a single feather edge lip 67. The plates 63 may have flange elements 69 lying in a parallel plane, the plates and elements being joined by offset sections 71. The flange elements may be provided with screw or rivet holes 73 by means of which they can be securely attached to a surface after the welt is conformed thereto. The safe outer edge is provided by curling the ends 75 of the flange elements 69 around a common longitudinal wire or rod 77. The ends 75 can be either slidable or can be fixed upon the rod 77 by crimping or the like. It will be observed that this form of welt is extremely flexible and can be used on rather sharply curved surfaces, and still have the benefit of lip support by the plates 63.

Complex bending of the weather welts has been illustrated in Fig. 1 and in the discussion of Fig. 5 simple bending in the plane of the reinforcement plates 39 was shown to provide many of the beneficial effects of the invention. Figs. 8 and 8a illustrated simple bending in the plane of the flange elements 11 of the weather welt 1 and it will be apparent from the preceding discussion that the reinforcement strip will also serve in this case to stabilize the lips in the manner indicated. In Figs. 8 and 8a the welt 1 of Fig. 2 is attached to the fender 81, by welding, screws, or other suitable means, around the periphery of the curved wheel opening 83 and the solid edge or strip 15 is preferably on the inside of the curve as shown. The fender shield 85 engages the lips 7 of the sealing member 3 and is connected to the fender in the usual manner (not shown). As already indicated, it is often not essential to the successful practice of the invention that the strip 15 be on the inside of the curve. Though the latter arrangement is preferred because it places the sealing member in a state of tension, the other lip stabilizing features are often sufficient to prevent buckling when the strip 15 is on the outside of the curve.

Fig. 7 shows a weather welt which comprises the sealing member 33 of Fig. 5 and the reinforcement strip 19 of Fig. 2. This type of sealing member is particularly effective in automobile door applications such as illustrated in Figs. 9-14 since it is capable of fitting around the corner 91 of the door jamb 93 when attached to the door 95. The gutter 97 between the lips 35 and 37 is under a slight vacuum when the door is closed and this increases the effectiveness of the seal. The lips sweep the surface of the jamb and tend to wipe away moisture and break up ice films. In this application various bending problems are encountered. On the top of the door (Fig. 10) there is primarily simple bending in the plane of the reinforcement plates 9. On the sides of the door (Figs. 11 and 13) there is complex bending having components in both the plane of the plates 9 and the flange elements 11. On the bottom (Fig. 12) no bending is necessary and there is simply a straight run of weather welt. Except for the hinged side, the sealing member 33 is preferably attached to the door 95 so as to fit in the corner between the flange of the front door face and the edge of the door thus, presenting the longer lip 35 as the first barrier to be passed by water or air attempting to reach the interior of the car. This attachment, as before, is accomplished by means of the flange elements 11 on the reinforcement strip 19, suitable fasteners 99 being used for securing purposes. As shown in these figures, the rebent portion 17 may be omitted from the strip construction if desired. On the hinged side of the door (Fig. 13) which has no front face flange extending beyond the side edge of the door, the heel of the sealing member 33 may be on the inside so that the longer lip 35 forms the first barrier to the entrance of moisture and air.

In Fig. 14 a door construction is shown wherein manufacturing inaccuracies resulted in an excess clearance between the door and jamb. With the present welt construction this is easily overcome by inserting a suitable tool, such as a screw driver, between the sealing member and the back of the face flange of the door 95 to pry the sealing member 33 away therefrom and bend the reinforcement plates 9 toward the corner 91 which is straddled by the lips 35 and 37. This enables the lips to contact the jamb 93 and provide effective sealing despite the excess clearance "X."

In Fig. 1a, the welt 1 of Fig. 2 is shown in cross section with a coating or covering 101 attached to the exposed surfaces of the reinforcement strip 19. This may be a rubber skin that is bonded to the strip in a conventional manner or a covering of fabric or other desired material. Such coating or covering may be used to prevent rusting of the strip, to improve its appearance, and to give it a soft and slightly resilient surface which adapts itself to irregularities on the surface to which it is secured.

The improved weather welt of this invention may be constructed in any desired manner. At the present time the best method consists in forming the sealing member by an extrusion process and simultaneously incorporating it upon and bonding it to the reinforcement strip. Very long lengths of welts can be quickly and cheaply constructed in this manner and these can subsequently be cut into the desired shorter lengths.

What is claimed is:

1. A weather welt comprising in combination an elongated member of elastic material having a base portion and a flexible portion extending from said base portion, and a plurality of individual relatively stiff reinforcing elements embedded in and bonded to the base portion and extending lengthwise of the member, said elements being uninterconnected in the base portion proximate to the root of the flexible portion except by the elastic material and serving to increase the elastic stability of the flexible portion.

2. A weather welt comprising in combination an elongated member of elastic material having a base portion and a laterally flexible portion extending from said base portion, a plurality of individual relatively stiff plates embedded in and bonded to the base portion and extending lengthwise of the member, said plates being uninterconnected in the base portion proximate to the root of the flexible portion except by the elastic material and serving to increase the elastic stability of the flexible portion, and a longitudinal mounting strip and securely joined to said plates, said strip extending outside of the base portion to provide means for attaching the welt to an object.

3. A weather welt comprising in combination an elongated member of elastic material having a base portion and a laterally flexible portion extending from said base portion, a plurality of individual relatively stiff plates embedded in and bonded to the base portion and extending lengthwise of the member, said plates being uninterconnected in the base portion proximate to the root of the flexible portion except by the elastic material and serving to increase the elastic stability of the flexible portion, and a longitudinal mounting strip securely joined to said plates, said strip extending outwardly of said body portion having a plurality of longitudinally spaced lateral slots commencing inwardly of the longitudinal outside edge thereof and extending to the plates.

4. A weather welt comprising in combination an elongated member of elastic material having a base portion and a laterally flexible portion extending from said base portion, a plurality of individual relatively stiff plates embedded in and bonded to the base portion and extending lengthwise of the member, said plates serving to increase the elastic stability of the flexible portion, and a longitudinal strip outside of the base portion, said plates being slidably mounted on the strip.

5. In a weather welt having an elongated sealing member, a series of longitudinally spaced coplanar plates embedded in and bonded to the member and extending outside thereof, a longitudinal rod outside of the member, said plates being uninterconnected in the member except by the member, the free ends of said plates being formed around said rod.

6. In a weather welt having an elongated elastic sealing member with a projecting lip subject to lateral buckling upon bending of the member, means for preventing such buckling of said lip comprising a series of longitudinally spaced reinforcement elements embedded in and bonded to the member, and extending outside of the member, and a longitudinal strip fixedly interconnecting the outside ends of the elements, said elements being connected only by said strip, said strip lying in the plane of bending.

7. In a weather welt having an elongated elastic sealing member with a projecting lip subject to lateral buckling upon bending of the member, means for preventing such buckling of said lip comprising a series of longitudinally spaced reinforcement elements embedded in and bonded to the member, said elements comprising plates extending outside of the member, and a longitudinal strip fixedly interconnecting the outside ends of the plates, said plates being connected only by said strip, the embedded portions of said plates lying in one plane of bending, said strip lying in a plane of bending intersecting the first plane.

8. A bendable weather welt comprising in combination an elongated member of elastic material having a base portion and a flexible sealing portion extending from the base portion, and a row of individual relatively stiff reinforcing elements embedded in and bonded to the base portion, said elements being spaced along the length of the member and the inner ends thereof proximate to the flexible portion being connected only by the material of the member, and means joining the outer ends of the elements and causing the spacing between the inner ends to vary when the member is bent in the plane of the elements.

ROBERT H. FLUES.

References Cited in the file of this patent

UNITED STATES PATENTS

| Number | Name | Date |
| --- | --- | --- |
| 2,146,090 | O'Rourke | Feb. 7, 1939 |
| 2,161,648 | Widman | June 6, 1939 |
| 2,219,382 | Conlon | Oct. 29, 1940 |
| 2,237,059 | Reid | Apr. 1, 1941 |
| 2,273,182 | Dodge | Feb. 17, 1942 |
| 2,603,528 | Higbie | July 15, 1952 |

FOREIGN PATENTS

| Number | Country | Date |
| --- | --- | --- |
| 552,198 | Great Britain | Mar. 26, 1943 |
| 794,152 | France | Dec. 2, 1935 |